(12) United States Patent
Tanaka et al.

(10) Patent No.: US 7,662,472 B2
(45) Date of Patent: Feb. 16, 2010

(54) PLAIN BEARING

(75) Inventors: Takuya Tanaka, Inuyama (JP); Teruo Abe, Inuyama (JP); Isei Naka, Inuyama (JP); Yoshimi Kuroda, Inabe (JP); Tomomi Okumura, Inabe (JP)

(73) Assignee: Daido Metal Co., Ltd., Nagota (JP)

( * ) Notice: Subject to any disclaimer, the term of this patent is extended or adjusted under 35 U.S.C. 154(b) by 151 days.

(21) Appl. No.: 11/730,569

(22) Filed: Apr. 2, 2007

(65) Prior Publication Data
US 2007/0230846 A1   Oct. 4, 2007

(30) Foreign Application Priority Data
Mar. 31, 2006   (JP) .............................. 2006-096174

(51) Int. Cl.
*B32B 15/08* (2006.01)
*F16C 33/02* (2006.01)

(52) U.S. Cl. ...................... 428/336; 428/409; 428/458; 384/276

(58) Field of Classification Search ........................ None
See application file for complete search history.

(56) References Cited

U.S. PATENT DOCUMENTS

| | | | | |
|---|---|---|---|---|
| 5,137,985 | A | * | 8/1992 | Chen et al. .................. 525/431 |
| 5,525,246 | A | * | 6/1996 | Kamiya et al. .............. 508/103 |
| 2003/0134141 | A1 | * | 7/2003 | Okado et al. ................ 428/626 |

FOREIGN PATENT DOCUMENTS

| | | |
|---|---|---|
| GB | 2398527 A | 8/2004 |
| JP | 4083914 | 3/1992 |
| JP | 9079262 | 3/1997 |
| JP | 2001343022 | 12/2001 |
| JP | 2003056566 | 2/2003 |
| JP | 2003056566 A | 2/2003 |
| JP | 2004019758 | 1/2004 |

OTHER PUBLICATIONS

UK Intellectual Property Office, "Combined Search and Examination Report under Sections 17 and 18(3)", Jun. 29, 2007.

* cited by examiner

*Primary Examiner*—Monique R Jackson
(74) *Attorney, Agent, or Firm*—Browdy and Neimark, PLLC

(57) ABSTRACT

An object of the present invention is to provide a plain bearing which can be further improved in bearing capability, in particular, anti-seizure property, initial conformability and cavitation resistance. In the present invention, a sliding layer 2 is formed on the surface of a bearing alloy layer 1 formed of a copper-based or aluminum-based alloy, and the sliding layer 2 comprises a resin binder obtained by applying a strong shearing force to a composition comprising a polybenzimidazole resin as main constituent and at least one member selected from the group consisting of a polyamide-imide resin, a polyamide resin and an epoxy resin, to make the composition into a polymer alloy, and 25 to 75 mass % of a solid lubricant. Owing to such a constitution, toughness and strength are imparted to the sliding layer 2 and the anti-seizure property, initial conformability and cavitation resistance can also be improved.

8 Claims, 1 Drawing Sheet

PLAIN BEARING

BACKGROUND OF THE INVENTION

The present invention relates to a plain bearing having a sliding layer on the surface of a bearing alloy layer formed of a copper-based or aluminum-based alloy.

Bearings for automobile engine have been those obtained by bonding a copper-based bearing alloy or an aluminum-based bearing alloy to the surface of a back metal made of a steel plate. Attempts were made to improve such bearings in wear resistance, anti-seizure property and initial conformability by forming a sliding layer as coating layer on the surface of a bearing alloy layer by incorporating a solid lubricant and the like into a thermosetting resin such as a polyamide-imide resin (a PAI resin), a polyimide resin (a PI resin) or an epoxy resin (an EP resin) as disclosed, for example, in JP-A-4-83914 (patent document 1) and JP-A-9-79262 (patent document 2). In addition, an attempt was made to improve the early wear resistance while maintaining the conformability, by forming a protective layer out of a solid lubricant and a binder composed of a thermoplastic resin and a thermosetting resin which are soluble in a polar solvent, as disclosed in JP-A-2001-343022 (patent document 3).

There is the following phenomenon: during the use of the plain bearing, cavities (bubbles) are produced in lubricating oil, so that erosion is caused on the surface of the bearing. This phenomenon is such that since the cavities produced in the lubricating oil are disintegrated under a high pressure, energy at the time of the disintegration destroys the surface of the bearing in the manner of attack. As to a countermeasure against this phenomenon, the resistance to cavitation has been improved by increasing the strength of a material for a sliding layer. For example, in JP-A-2004-19758 (patent document 4), an attempt was made to improve the wear resistance, anti-seizure property and cavitation resistance by forming a sliding layer by incorporating a solid lubricant and the like into a polybenzimidazole resin (a PBI resin). Furthermore, in JP-A-2003-56566 (patent document 5), the sliding characteristics are improved by the use of a solid lubricant containing lead and a resin binder comprising at least one resin selected from a PAI resin, a PI resin, an EP resin and a PBI resin.

The inventions disclosed in the above-mentioned patent documents 1 to 5, however, do not sufficiently satisfy the demand for the bearing capability (anti-seizure property, initial conformability and cavitation resistance) of the plain bearing based on performance characteristics improvement and a load increase required with a recent increase in the power and revolution of internal combustion engines. For example, in the case of the invention disclosed in the above-mentioned patent document 5, the production of a resin binder by mixing of a PAI resin, a PI resin, an EP resin and a PBI resin is described. However, in such a simple polymer blend, the resins are not blended with one another and are merely dispersed as clusters. Therefore, the resin binder is disadvantageous in that since there is the nonuniformity of physical properties in a sliding surface, a sufficient anti-seizure property, in particular, a sufficient cavitation resistance cannot be attained.

The above-mentioned patent document 3 states "when a thermosetting resin and a thermoplastic resin are dissolved in a solvent, they are entirely mixed with each other as very fine units similar to molecules and the resulting binder has properties intermediate between those of the thermoplastic resin and those of the thermosetting resin." The expression "entirely mixed with each other" means that the thermosetting resin and the thermoplastic resin are in the form of clusters though the clusters are very fine (micro-clusters). Therefore, the thermosetting resin and the thermoplastic resin are not in a blended state and the properties intermediate between those of the thermosetting resin and those of the thermoplastic resin are attained by the fine dispersion of the thermoplastic resin in the thermosetting resin. Such a binder is disadvantageous in that when it is used in the sliding layer of a plain bearing used under conditions under which cavitation phenomenon occurs, stress due to cavitation is centered at the boundary surface between the resin phases at which physical properties become discontinuous, so that the cavitation resistance is deteriorated.

SUMMARY OF THE INVENTION

The present invention was made in view of the above situation, and an object thereof is to provide a plain bearing having a sliding layer on the surface of a bearing alloy layer formed of a copper-based or aluminum-based alloy which can be further improved in bearing capability, in particular, anti-seizure property, initial conformability and cavitation resistance.

In order to achieve the above object, the present invention provides the following plain bearings.

(1) A plain bearing having a sliding layer on the surface of a bearing alloy layer formed of a copper-based or aluminum-based alloy, wherein said sliding layer comprises a resin binder obtained by applying a strong shearing force to a composition comprising a polybenzimidazole resin as main constituent and at least one member selected from the group consisting of a polyamide-imide resin, a polyamide resin and an epoxy resin, to make the composition into a polymer alloy, and 25 to 75 mass % of a solid lubricant.

(2) A plain bearing according to (1), wherein said solid lubricant comprises at least one compound selected from a polytetrafluoroethylene, graphite and molybdenum disulfide.

(3) A plain bearing according to (1) or (2), wherein said resin binder obtained as the polymer alloy comprises the polybenzimidazole resin and the at least one member selected from the group consisting of a polyamide-imide resin, a polyamide resin and an epoxy resin, in a proportion of less than 50 mass % and not less than 3 mass %.

(4) A plain bearing according to (3), wherein said resin binder obtained as the polymer alloy contains at least 3 to 20 mass % of the polyamide-imide resin.

(5) A plain bearing according to (3), wherein said resin binder obtained as the polymer alloy contains at least 3 to 30 mass % of the polyamide resin.

(6) A plain bearing according to (3), wherein said resin binder obtained as the polymer alloy contains at least 3 to 10 mass % of the epoxy resin.

(7) A plain bearing according to any one of (1) to (5), wherein said sliding layer has a surface roughness of not more than Ra 0.5 μm.

(8) A plain bearing according to any one of (1) to (7), wherein said sliding layer has a thickness of 2 to 30 μm.

BRIEF DESCRIPTION OF THE DRAWING

In FIG. 1, numeral 1 denotes a bearing alloy layer, numeral 2 a sliding layer, and numeral 3 a back metal.

DETAILED DESCRIPTION OF THE INVENTION

Figure 1:
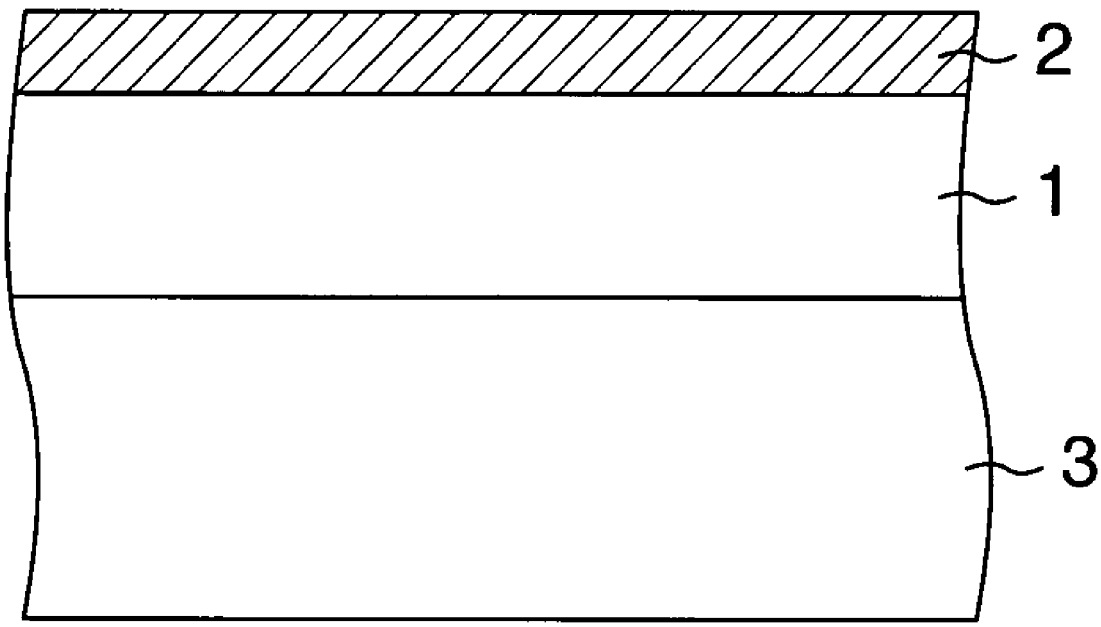
FIG. 1 is a cross-sectional view of a plain bearing in one embodiment of the present invention.

In the aspect (1) of the invention, the polybenzimidazole resin (hereinafter referred to as "PBI resin") as the main constituent of the sliding layer is superior in not only heat resistance but also material strength to polyamide-imide resins (hereinafter referred to as "PAI resins"), polyamide resins (hereinafter referred to as "PA resins"), epoxy resins (hereinafter referred to as "EP resins") and the like and hence can improve the wear resistance. In addition, since a decrease in the material strength of the PBI resin caused in a high-temperature atmosphere and that caused by heat generation during sliding are only slight, the PBI resin can maintain a satisfactory wear resistance even during high-temperature sliding. Moreover, at least one member selected from the group consisting of a PAI resin, a PA resin and an EP resin is added to the PBI resin and the resulting composition is made into a polymer alloy by the application of a strong shearing force, whereby toughness and strength are imparted to the sliding layer and the anti-seizure property, initial conformability and cavitation resistance can also be improved. The PBI resin, PAI resin, PA resin and EP resin before making the composition into the polymer alloy are in a state in which polymers as the resins are intertwined with one another. When a conventional mixing method is adopted, the polymers intertwined one another cannot be completely loosened, so that the resins cannot be completely blended. When the resins are mixed while applying a strong shearing force to them, the polymers intertwined one another as the resins are loosened, so that the resins can be homogeneously blended.

Furthermore, since the sliding layer contains the solid lubricant, the coefficient of friction can be reduced, so that the anti-seizure property can be improved. In this case, when the content of the solid lubricant is less than 25 mass %, the lubricity-improving effect of the solid lubricant is hardly obtained. When the content is more than 75 mass %, the cavitation resistance is deteriorated. Therefore, the content of the solid lubricant is preferably in the range of 25 to 75 mass %.

In the aspect (2) of the invention, at least one compound selected from a polytetrafluoroethylene (hereinafter referred to as "PTFE"), graphite and molybdenum disulfide is preferably used as the solid lubricant.

In the aspect (3) of the invention, in particular, the initial conformability and the cavitation resistance are further improved when the proportion of the resin(s) added is less than 50 mass % and not less than 3 mass %.

In the aspect (4) of the invention, since the PAI resin contributes to the improvement of the toughness of the sliding layer, the incorporation of the PAI resin into the sliding layer further improves the initial conformability. In this case, when the content of the PAI resin in the resin binder is 3 to 20 mass %, the initial conformability and the cavitation resistance are further improved.

In the aspect (5) of the invention, since the PA resin contributes to the improvement of the toughness of the sliding layer, the incorporation of the PA resin into the sliding layer permits further improvement of the conformability and the cavitation resistance. In this case, when the content of the PA resin in the resin binder is 3 to 30 mass %, the initial conformability and the cavitation resistance are further improved.

In the aspect (6) of the invention, since the EP resin contributes to the improvement of the strength of the sliding layer, the incorporation of the EP resin into the sliding layer permits further improvement of the cavitation resistance. In this case, when the content of the EP resin in the resin binder is 3 to 10 mass %, the cavitation resistance and the anti-seizure property can be further improved.

In the aspect (7) of the invention, when the surface roughness of the sliding layer is high, an oil film is liable to be ruptured, so that the surface of the sliding layer is apt to come into contact with an associated shaft. Therefore, seizure tends to be caused by heat generation by friction. Particularly when the surface roughness of the sliding layer in initial sliding is not more than Ra 0.5 μm, the rupture of an oil film brings the surface of the sliding layer into contact with the associated shaft, so that the outermost surface of the sliding layer is immediately worn away, resulting in a low surface roughness. Therefore, oil is supplied to the surface of the sliding layer and hence the formation of an oil film is facilitated, so that seizure is hardly caused. When the surface roughness of the sliding layer in initial sliding is more than Ra 0.5 μm, the surface of the sliding layer comes into contact with the associated shaft, so that the outermost surface of the sliding layer is worn away. But when the initial roughness is high, the roughness of the surface of the sliding layer is not immediately reduced even by the wear and hence the supply of oil to the surface of the sliding layer is still difficult, so that the anti-seizure property is not improved.

In addition, under such use conditions that a high load is applied to the associated shaft during sliding, the deflection and vibration of the associated shaft and the like occur, so that the sliding layer comes into contact with local contact with the associated shaft. In this case, the sliding layer reduces a local load increase by undergoing plastic deformation or elastic deformation in the contact portion or by its abrasion. Therefore, the occurrence of seizure becomes difficult. Accordingly, in the aspect (8) of the invention, when the thickness of the sliding layer is 2 to 30 μm, preferably 5 to 10 μm, the sliding layer undergoes plastic deformation or elastic deformation and hence can reduce a local load increase. When the thickness of the sliding layer is less than 2 μm, the plastic deformation or elastic deformation is not sufficient and hence the sliding layer cannot reduce a local load increase, so that the anti-seizure property is not improved. When the thickness of the sliding layer is more than 30 μm, the thermal conductivity is deteriorated, so that the anti-seizure property is not improved.

DESCRIPTION OF PREFERRED EMBODIMENTS

Embodiments of the present invention are explained below. FIG. 1 is a cross-sectional view of a plain bearing which schematically shows an embodiment of the present invention. The plain bearing has a structure formed by forming a sliding layer 2 on the surface of a bearing alloy layer 1 of a copper-based or aluminum-based alloy bonded to the surface of a back metal 3. In this embodiment, the sliding layer 2 comprises a resin binder obtained by making a composition comprising a PBI resin as main constituent and at least one member selected from the group consisting of a PAI resin, a PA resin and an EP resin into a polymer alloy, and a solid lubricant. As the solid lubricant, there are used molybdenum disulfide ($MoS_2$), graphite (Gr), polytetrafluoroethylene (PTFE), tungsten disulfide ($WS_2$), boron nitride (BN) and the like. If necessary, the sliding layer may contain hard grains, soft metals and the like. As the hard grains, there can be used nitrides such as silicon nitride ($Si_3N_4$), etc.; oxides such as aluminum oxide ($Al_2O_3$), silicon oxide ($SiO_2$), titanium oxide ($TiO_2$), etc.; and carbides such as silicon carbide (SiC), etc. As the soft metals, there can be used copper, silver, gold, aluminum, tin, zinc, bismuth, and alloys thereof.

Next, a seizure test and a cavitation resistance test were carried out for specimens of examples having a sliding layer according to the present invention and specimens of comparative examples having a conventional sliding layer. The results obtained are shown in Table 1. The specimens of examples were produced as follows. A copper-based bearing alloy layer was bonded to the surface of a steel plate as back metal, formed into a flat plate shape and then degreased, after which the surface of the bearing alloy layer was roughened by blasting. The roughened surface was washed with an acid, washed with warm water and then dried. Thereafter, the composition listed for each of examples 1 to 15 in Table 1 was diluted with an organic solvent (N-methyl-2-pyrrolidone) and a strong shearing force was applied to the diluted composition with a homogenizer for a long period of time (not less than 1 hour) to effect blending and homogenization. The composition thus treated was applied on the surface of the above-mentioned bearing alloy layer by spraying with an air sprayer. Then, the organic solvent was removed by drying, followed by baking at 250° C. for 60 minutes. Here, the thickness of the sliding layer was adjusted to 5 μm for both the seizure test and the cavitation resistance test. The composition was made into a polymer alloy by the above-mentioned application of the strong shearing force to the composition with the homogenizer.

On the other hand, the specimens of comparative examples were produced as follows. A copper-based bearing alloy layer was bonded to the surface of a steel plate as back metal, formed into a flat plat shape and then degreased, after which the surface of the bearing alloy layer was roughened by blasting. The roughened surface was washed with an acid, washed with warm water and then dried. Thereafter, the composition listed for each of comparative examples 1 to 5 in Table 1 was diluted with an organic solvent (N-methyl-2-pyrrolidone) and a strong shearing force was applied to the diluted composition with a homogenizer to effect blending and homogenization. The composition thus treated was applied on the surface of the above-mentioned bearing alloy layer by spraying with an air sprayer. Then, the organic solvent was removed by drying, followed by baking at 250° C. for 60 minutes. Here, the thickness of the sliding layer was adjusted to 5 μm for both the seizure test and the cavitation resistance test. In the case of comparative examples 2 and 5, the composition was made into a polymer alloy by the above-mentioned application of the strong shearing force to the composition with the homogenizer. In the case of comparative example 6, the same composition as that for example 5 was mixed and stirred with an ultrasonic stirrer and applied on the surface of the above-mentioned bearing alloy layer by spraying with an air sprayer. Then, the organic solvent was removed by drying, followed by baking at 250° C. for 60 minutes. Here, the thickness of the sliding layer was adjusted to 5 μm for both the seizure test and the cavitation resistance test.

TABLE 1 composition and the results of seizure test and cavitation test

| | | Content of lubricant in composition (mass %) | | | Content of binder in composition | Content of each resin in resin binder (mass %) | | | | Torque change | Seizure load | Volume loss |
| --- | --- | --- | --- | --- | --- | --- | --- | --- | --- | --- | --- | --- |
| | | $MoS_2$ | Gr | PTFE | (mass %) | PBI | PAI | PA | EP | (N·m) | (MPa) | (mm³) |
| Comparative Example | 1 | 20 | | | 80 | 100 | | | | 3 | 24 | 1.08 |
| | 2 | 24 | | | 76 | 76 | 16 | | 8 | 2.3 | 18 | 1 |
| | 3 | 50 | | | 50 | 100 | | | | 1.5 | 24 | 1.21 |
| | 4 | 60 | | | 40 | 100 | | | | 1 | 24 | 1.12 |
| | 5 | 77 | | | 23 | 57 | 22 | 17 | 4 | 0.8 | 24 | 1.42 |
| | 6 | 60 | | | 40 | 77 | 18 | | | 0.9 | 21 | 1.49 |
| Example | 1 | 60 | | | 40 | 97 | 3 | | | 0.9 | 27 | 0.97 |
| | 2 | 60 | | | 40 | 97 | | 3 | | 0.9 | 27 | 0.9 |
| | 3 | 60 | | | 40 | 97 | | | 3 | 1 | 24 | 0.93 |
| | 4 | 60 | | | 40 | 95 | | | 5 | 1 | 24 | 0.94 |
| | 5 | 60 | | | 40 | 77 | 18 | | | 0.7 | 30 | 0.96 |
| | 6 | 60 | | | 40 | 72 | 22 | | | 0.7 | 24 | 0.93 |
| | 7 | 29 | | | 71 | 73 | 18 | | 9 | 1.2 | 27 | 0.82 |
| | 8 | 29 | | | 71 | 71 | 18 | | 11 | 0.9 | 21 | 0.83 |
| | 9 | 50 | | | 50 | 77 | 19 | | 4 | 0.8 | 24 | 0.89 |
| | 10 | 50 | | | 50 | 65 | 13 | 16 | 6 | 0.7 | 30 | 0.8 |
| | 11 | 50 | | | 50 | 54 | 13 | 29 | 4 | 0.7 | 30 | 0.77 |
| | 12 | 50 | | | 50 | 51 | 13 | 32 | 4 | 0.7 | 24 | 0.78 |
| | 13 | 70 | | | 30 | 67 | 17 | 13 | 3 | 0.8 | 30 | 0.91 |
| | 14 | 30 | 20 | | 50 | 61 | 15 | 18 | 5 | 0.8 | 27 | 0.82 |
| | 15 | 30 | | 20 | 50 | 61 | 15 | 18 | 5 | 1 | 30 | 0.83 |

The seizure test was carried out with a ring on disk tester under the test conditions shown in Table 2. Friction torque and seizure load were measured while increasing the specific load on bearing by 3 MPa at intervals of 30 minutes. The friction torque increases immediately after the increase of the cumulative load. In this case, the sliding surface undergoes plastic deformation or elastic deformation and hence reduces a local load increase to reduce the friction torque. Thus, the sliding surface assumes a stationary abrasion state to become stable. Here, the lower the degree of change of the friction toque, the higher the initial conformability. Therefore, the degree of change of the friction torque was measured to evaluate the initial conformability. A specific load at which the temperature of back of the bearing became higher than 200° C. or the friction torque became not less than 392 N·m was taken as a seizure load. The cavitation resistance test was carried out under the test conditions shown in Table 3, with a tester utilizing ultrasonic waves. The weight loss of the sliding layer was measured and then expressed in terms of the volume to determine the volume loss.

TABLE 2

Seizure resistance test conditions

| Item | Test conditions | Unit |
| --- | --- | --- |
| Dimensions of specimen | Outside diameter 27.2 × inside diameter 22.0 × thickness 1.6 | mm |
| Peripheral speed | 2 | m/s |
| Specific load | Increased by 3 MPa at intervals of 30 minutes | — |
| Lubricating oil | SAE#30 | — |
| Temperature of lubricating oil | 60 | ° C. |
| Lubrication method | Oil dropping | — |
| Material for shaft | S55C | — |
| Roughness | 0.25 | Ra μm |
| Hardness | 500~700 | Hv10 |

TABLE 3

Cavitation test conditions

| Item | Test conditions | Unit |
| --- | --- | --- |
| Dimensions of specimen | 50 × 50 | mm |
| Ultrasonic oscillator | | |
| 1. Frequency | 19000 | Hz |
| 2. Output | 600 | W |
| 3. Lubricant | Water | — |
| 4. Lubricant temperature | Room temperature | — |
| 5. Clearance | 0.5 | mm |
| 6. Horn diameter | 20 | mm |
| 7. Test time | 2 | min. |

In the above Table 1, the figures for each constituent of the sliding layer stand for percentages by mass (mass %). At first, from the specimen in which the base resin of the sliding layer was composed of only a PBI resin (comparative example 4), the specimens of examples 1, 2, 5 and 6 are different in that in these specimens, the PBI resin and a PAI resin or a PA resin were made into a polymer alloy. As can be seen from the test results, the specimens of examples 1, 2, 5 and 6 are superior to the specimen of comparative example 4 with respect to the degree of torque change, seizure load and cavitation resistance. The reason is as follows: since toughness was imparted by adding the PAI resin or PA resin to the PBI resin and making the resulting composition into the polymer alloy, the initial conformability and the anti-seizure property were improved and the occurrence of erosion by cavitation was suppressed.

From the specimen of comparative example 4 in which the base resin of the sliding layer was composed of only the PBI resin, the specimens of examples 3 and 4 are different only in that in these specimens, an EP resin was added to the PBI resin. As can be seen from the test results, the specimens of examples 3 and 4 are substantially equal to the specimen of comparative example 4 in the degree of friction torque change and seizure load but are superior thereto with respect to volume loss. The reason is as follows: since the EP resin was added to the PBI resin, the PBI resin was made into a polymer alloy and hence the strength of the sliding layer was improved, so that the occurrence of erosion by cavitation was suppressed.

When the specimen of comparative example 5 and the specimen of example 13 are compared, they are substantially equal in the degree of friction torque change but the specimen of example 13 is superior with respect to seizure load and volume loss. The reason is as follows: since the amount of the solid lubricant added in comparative example 5 was more than 70% by weight, the seizure load and the cavitation resistance were deteriorated by the decrease of the strength of the sliding layer.

When the specimen of comparative example 2 and the specimen of example 7 are compared, they are substantially equal in volume loss but the specimen of example 7 is superior with respect to the degree of friction torque change and seizure load. The reason is as follows: since the amount of the solid lubricant added in comparative example 3 was less than 25% by weight, the sliding characteristics were not satisfactory and the toughness of the sliding layer was not sufficient, and hence initial conformation hardly occurred. Therefore, the amount of the solid lubricant added is preferably 25 to 75% by weight.

When the specimen of comparative example 6 and the specimen of example 5 are compared, they are substantially equal in the degree of friction torque change but the specimen of example 5 is superior with respect to seizure load and volume loss. The reason is as follows: in comparative example 6, since the resins were dissolved in the solvent and mixed and stirred as very fine units similar to molecules but were in the form of not a homogeneous substance but microclusters, stress due to cavitation was centered at the boundary surface between the resin phases at which physical properties become discontinuous (or the strength is low), so that the cavitation resistance was deteriorated.

On the other hand, in example 5, a strong shearing force was applied at the time of the mixing to make the PBI resin and the PAI resin present each in a monomolecular form, whereby the resins could be made into a polymer alloy and were thoroughly blended with each other to become a single substance. Therefore, no discontinuous portion was formed in the resin binder, so that the cavitation resistance was improved.

In the case of examples 1 and 5, it can be seen that the anti-seizure property is especially good when the content of the PAI resin in the resin binder obtained as the polymer alloy is 3 to 20 mass %.

In the case of examples 2, 10 and 11, it can be seen that the anti-seizure property is especially good when the content of the PA resin in the resin binder obtained as the polymer alloy is 3 to 30 mass %.

In the case of examples 3 and 7, it can be seen that the anti-seizure property is especially good when the content of the EP resin in the resin binder obtained as the polymer alloy is 3 to 10 mass %.

The present invention is not limited to the examples described above and shown in the drawing and may be modified or extended as follows. An apparatus for applying a strong shearing force to the resin composition is not limited to a homogenizer, but may be a high-pressure jet stirring and mixing machine or the like. A method for roughening the surface of the bearing alloy layer is not limited to blasting, but may be etching, flame spraying, conversion treatment or the like. A method for coating with a resin surface layer and a bonding layer is not limited to an air spraying method, but may be a pad printing method, a screen printing method, a roll coating method or the like. It is also possible to produce a plain bearing by forming the sliding layer 2 on the bearing alloy layer 1 and then forming the resulting assembly into the shape of the plain bearing. The plain bearing of the present invention can be used also as a bearing other than that for an automobile engine, such as a bearing for a compressor. Furthermore, the plain bearing of the present invention can be used not only under hydrodynamic lubrication but also under boundary lubrication or without lubrication.

The invention claimed is:

1. A plain bearing, comprising:
   a sliding layer on the surface of a bearing alloy layer formed of a copper-based or aluminum-based alloy,
   wherein said sliding layer comprises
   a resin binder, being a polymer alloy, comprising (1) a polybenzimidazole resin as main constituent, (2) a polyamide-imide resin, and (3) at least one of a polyamide resin and an epoxy resin,
   wherein the resins are thoroughly blended to single homogeneous substance, and
   a solid lubricant constituting 25 to 75 mass % based on the total mass of the sliding layer.

2. A plain bearing according to claim 1, wherein said solid lubricant comprises at least one compound selected from the group consisting of polytetrafluoroethylene, graphite and molybdenum disulfide.

3. A plain bearing according to claim 1, wherein said resin binder is present in the sliding layer in a proportion of less than 50 mass % and not less than 3 mass % based on the total mass of the resin binder.

4. A plain bearing according to claim 3, wherein said resin binder obtained as the polymer alloy contains at least 3 to 20 mass % of the polyamide-imide resin based on the total mass of the resin binder.

5. A plain bearing according to claim 3, wherein said resin binder obtained as the polymer alloy contains at least 3 to 30 mass % of the polyamide resin based on the total mass of the resin binder.

6. A plain bearing according to claim 3, wherein said resin binder obtained as the polymer alloy contains at least 3 to 10 mass % of the epoxy resin based on the total mass of the resin binder.

7. A plain bearing according to claim 1, wherein said sliding layer has a surface roughness of not more than Ra 0.5 μm.

8. A plain bearing according to claim 1, wherein said sliding layer has a thickness of 2 to 30 μm.

* * * * *